(12) United States Patent
Emericks et al.

(10) Patent No.: US 6,239,648 B1
(45) Date of Patent: *May 29, 2001

(54) SYSTEM AND METHOD FOR DISSIPATING HEAT IN AN ELECTRIC DEVICE

(75) Inventors: Anders Emericks, Sundbyberg; Henrik Hellberg, Solna; Mattias Israelsson; Carl-Henrik Malmgren, both of Stockholm, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,414

(22) Filed: Nov. 7, 1997

(30) Foreign Application Priority Data

Nov. 8, 1996 (SE) .................................................. 9604095

(51) Int. Cl.[7] .................................................. H04M 19/00
(52) U.S. Cl. .......................... 327/512; 327/540; 379/412
(58) Field of Search .................................... 327/545, 512, 327/309, 65, 67, 68, 73, 74, 77, 538, 540; 361/18, 119; 379/412, 413

(56) References Cited

U.S. PATENT DOCUMENTS

| 4,150,411 | * | 4/1979 | Howell | 361/45 |
| 4,800,589 | | 1/1989 | Siligoni et al. | 379/413 |
| 5,381,113 | * | 1/1995 | Kimura | 330/253 |
| 5,428,682 | * | 6/1995 | Apfel | 379/413 |
| 5,475,323 | * | 12/1995 | Harris et al. | 327/67 |
| 5,519,775 | * | 5/1996 | Lagana et al. | 379/412 |
| 5,596,637 | * | 1/1997 | Pasetti et al. | 379/412 |
| 5,929,616 | * | 7/1999 | Perraud et al. | 323/274 |

FOREIGN PATENT DOCUMENTS

| 0 622 943 A1 | 11/1994 | (EP) | H04M/19/00 |
| 2 690 537 | 10/1993 | (FR) | H04M/19/00 |
| 2 050 115 | 12/1980 | (GB) | H04M/19/00 |
| 446 798 | 12/1980 | (SE) | H04M/19/00 |
| 503 646 | 7/1996 | (SE) | H04M/19/00 |

* cited by examiner

Primary Examiner—Timothy P. Callahan
Assistant Examiner—Terry L. Englund
(74) Attorney, Agent, or Firm—Burns, Doane, Swecker & Mathis, L.L.P.

(57) ABSTRACT

The present invention relates to a method and a device for diversion of power in an electric circuit (1), e.g. a subscriber circuit with a balanced two-wire transmission, comprising a user (3) with a variable voltage requirement, which is controlled by the supply characteristic of the device and the resistance in the two-wire transmission (A,B,L). The voltage requirement of the user is fed back via a reference signal ($U_{REF}$) to an input of a voltage-regulating circuit (2), which supplies the user with a drive voltage ($V_{BAT2}$) adapted to the value of the reference signal. The voltage-regulating circuit (2) is fed with a supply voltage ($V_{BAT}$) and a regulator voltage ($V_0$) is defined as the difference between the drive voltage ($V_{BAT2}$) and the supply voltage ($V_{BAT}$). Parallel with the voltage-regulating circuit, an external device (8), e.g. a resistance, is connected in order to divert an undesired power generation in the voltage-regulating circuit through the whole or part of the supply current of the user being led to the external resistance and there the whole or part of the power generation is emitted.

9 Claims, 1 Drawing Sheet

SYSTEM AND METHOD FOR DISSIPATING HEAT IN AN ELECTRIC DEVICE

TECHNICAL FIELD

The present invention relates to a method and a device for diverting waste power in an electric device.

STATE OF THE ART

When connecting for example an electric circuit with a variable load, problems can occur with overheating of certain of the constituent components in the electric circuit. This problem is known and a number of technical solutions have been developed in order to take care of this.

In many solutions it is accepted that waste power occurs in the circuit. Other solutions use a DC/DC-converter for each load, the output voltage of which is continually controlled in order to be adapted according to the actual load. Another alternative is, if there is access to two or more supply voltages in the circuit, to reduce the waste power in the circuit through switching between them for the lowest adequate supply voltage for the occasion, which is described in SE Patent 9403876-7.

U.S. Pat. No. 5,428,682 describes a technique for conducting away heat in a telephone circuit. This consists of two line supply amplifiers, one for each exiting telephone line, which outputs are connected to earth respectively the supply voltage by a pair of switches and two external resistances. The switches permit a pole reversal of a DC-supply to the telephone line. In the external resistances the undesired heat can be given off and the heat generation in the telephone circuit remains at an acceptable level.

SE Patent 8003419-2 describes a technique with connection of an external resistance for heat diversion, which resembles greatly the technique in the above mentioned U.S. Pat. No. 5,428,682.

GB Patent 2 050 115 A describes a technique where a resistance is connected into the final stage of an amplifier which has a certain output line current. The generated power in the final stage transistors is reduced through a part of the output line current passing through the resistance, and in this way the generated heat in the final stage is held at an acceptable level.

FR Patent 2 690 537 describes a technique where a current regulator in a line supply circuit limits an output current through the connection of a resistance.

DISCLOSURE OF THE INVENTION

A circuit, for example a line circuit comprising a final stage and a voltage regulator, which is to drive a balanced two-wire transmission with both an AC-signal and a DC-current, has a DC-supply characteristic which means that the line voltage and the DC-current is a function of a combined resistance in the line and load of the circuit. With the line open, the line is supplied with the maximal line voltage at the same time as the DC-current is zero, and furthermore the final stage of the circuit must have access to a drive voltage which is somewhat greater than the required line voltage. The drive voltage is obtained from the output of the voltage regulator which in turn is supplied from the drive voltage of the circuit.

When the line is loaded the line voltage will drop and the DC-current will rise depending on the resistance of the line and the load and on the supply characteristic of the line circuit. A so-called regulator voltage, which is the difference between the supply voltage of the circuit and the drive voltage of the final stage, is generated in this case over the voltage regulator at the same time as the DC-current flows through it, which leads to an undesirable power generation in the voltage regulator.

The undesired power generation can be difficult to lead away so that the temperature of the circuit is held at a safe level.

The power generation in the circuit, more closely defined that over the voltage regulator, is greatest in short lines, i.e. when the total resistance of the line and the load has a low value, as both the regulator voltage and the DC-current through the voltage regulator are large.

The present invention tackles a problem with diverting waste power in a circuit through emitting it in an outer component.

Another problem is to obtain the above described function with the smallest possible interference in an existing circuit.

The object of the present invention is, through diverting a part of the waste power of a circuit to an outer component, to increase the life length of the circuit and to reduce its thermal effects.

The above problem is solved through connecting an external component, e.g. a resistance, in parallel with the voltage regulator of the circuit, which leads to that all or part of the waste power of the circuit being emitted in the external component.

An electric device, e.g. a subscriber line circuit, comprises a user with a variable voltage requirement and a voltage-regulating circuit, e.g. a voltage regulator. The voltage requirement of the user is fed back via a reference signal to an input on the voltage regulator, which supplies the user with a drive voltage adapted to the value of the reference signal. Over the voltage regulator there is formed a voltage drop from the difference between the drive voltage and the supply voltage of the circuit. The size of the voltage drop depends on the value of the varying drive voltage. When the voltage regulator is connected in parallel with an external component, e.g. a resistance, the electric circuit is relieved when all or part of the user's supply current is led to the external resistance and then all or part of the waste power of the voltage regulator is emitted.

An advantage of the suggested invention is that only one resistance is required in order to take care of waste power in the circuit. Another advantage is that there is no longer need for any switches for pole reversing of the DC-supply of the two-wire transmission.

Yet another advantage is that the invention is easy to implement without large changes to an already existing circuit solution.

The invention will now be described more closely with the help of the preferred embodiment and with reference to the appended drawing.

PREFERRED EMBODIMENT

Figure 1:
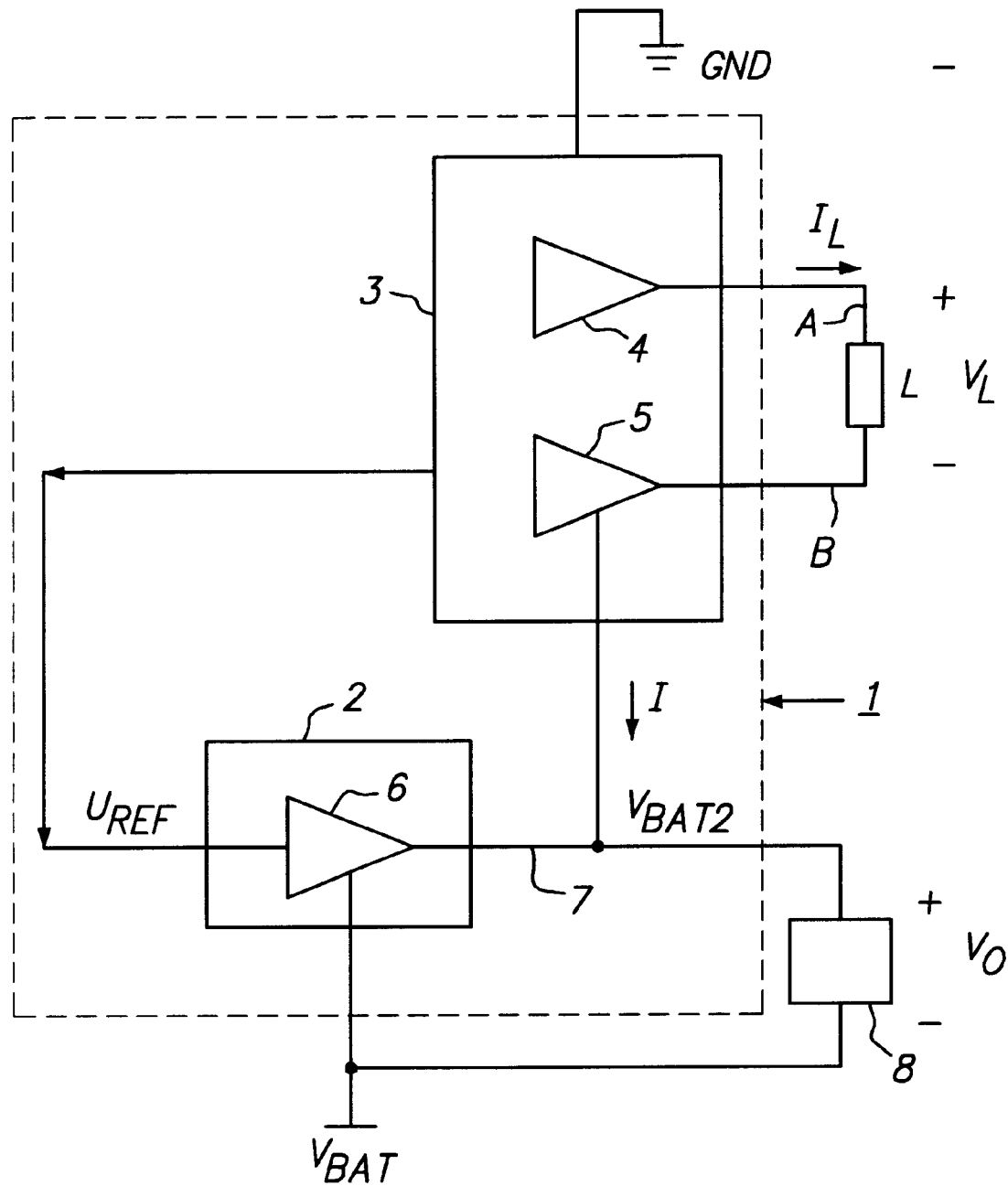
FIG. 1 shows an electric circuit with a heat dissipating device according to the invention.

FIG. 1 shows a generalized view of an electric circuit 1 with a heat dissipating device 8 according to the invention. The electric circuit comprises a voltage-regulating circuit 2, which is connected to the supply voltage $V_{BAT}$ of the circuit and which supplies a user 3 with a drive voltage $V_{BAT2}$. In the embodiment shown the user 3 is a schematically shown subscriber line circuit comprising two final amplifiers 4 and 5 with two wires A and B, which at their other end are connected to a load L in the form of e.g. a subscriber apparatus, and the voltage-regulating circuit comprises a voltage regulator 6. The user is connected between earth GND and the output 7 of the voltage regulator. A heat dissipating device 8, which comprises at least one component with a resistive part, e.g. a resistance, is connected parallel with the output 7 of the voltage regulator and the supply voltage $V_{BAT}$.

The user which is connected between earth GND and the drive voltage $V_{BAT2}$ has a varying voltage requirement which can be read and fed back to the voltage regulator 6 of the circuit via a reference signal $U_{REF}$. Depending on the voltage requirement of the user a voltage drop $V_0$ of varying size will occur between the drive voltage $V_{BAT2}$ and the supply voltage $V_{BAT}$ of the circuit. In the embodiment shown a current $I_L$ flows from one amplifier 4 through the wire A to the load L and further to the second amplifier 5. The wires A and B and the load L have an inbuilt resistance, which leads to the occurrence of a potential difference $V_L$ between the amplifiers. Variations in the current and in the inbuilt resistance for the two-wire transmission result in a potential variation between the amplifiers. The potential variation leads to the voltage requirement of the user also being variable and furthermore a variable supply current I flowing through the user.

A voltage $V_0$ occurs over the voltage-regulated circuit 2, which is equal to $$V_0 = V_{BAT} - V_{BAT2} \tag{1},$$

where the drive voltage is a function of the potential difference between the final amplifiers, $V_{BAT2} = f(V_L)$, which gives $$V_0 = V_{BAT} - f(V_L) \tag{2}.$$

From equation 2 it can be clearly seen that the regulator voltage $V_0$ can vary depending on the resistance in the line and the load. If the external power dissipating device 8 is not connected then the whole of the supply current I will flow through the voltage-regulating circuit 2 and give rise to the undesired power generation when the regulator voltage $V_0$ increases. When the external device 8 is turned on, all or part of the current I will pass through the external device 8 instead of through the voltage-regulating circuit 2. The undesired waste power will therefore be emitted in the external device and not influence the thermal conditions for the electric circuit 1.

This method for dissipating the waste power in an electric device can be applied in the case that a part of a current I, which flows through a user with a variable voltage requirement, is fed from a voltage-regulating circuit 2. Through the connection of an external device 8 with a resistive part, the whole or part of the current can be led away from the voltage-regulating circuit and away from the electric device.

The external power dissipating device can in its simplest embodiment consist of a resistance but it only needs to include a component with a resistive characteristic, e.g. a transistor, in order for the device to function according to a power dissipating principle.

A subscriber line circuit is often realized in a semiconductor chip, so-called SLIC, which has a limited durability as far as heat generation is concerned. The above described embodiment is naturally applicable even in the case when for example the user and the voltage-regulating circuit are not constructed on the same semiconductor chip, but the dashed line can for example be a printed circuit or an electric device where a heat dissipating function is desired in the form of a device 8.

The invention is naturally not limited to the embodiments described above and shown on the drawing but can be modified within the scope of the accompanying claims.

What is claimed is:

1. A method for dissipating heat generated on a printed circuit, the printed circuit comprising a supply voltage input, a user with a varying voltage requirement and a voltage-regulating circuit with an output connected to the user for supplying the user with a drive voltage, the drive voltage being regulated through the use of a reference signal which is supplied to the voltage-regulating circuit from the user, said method comprising the step of:

connecting a heat dissipating device, comprising at least a resistive part, between the output of the voltage-regulating circuit and the supply voltage input, such that the heat dissipating device is connected in parallel with the voltage-regulating circuit, so that at least a portion of a current supplied to the user passes through the heat dissipating device, wherein the heat dissipating device is external to the printed circuit.

2. The method of claim 1 wherein the heat dissipating device comprises only the resistive part.

3. A system for dissipating heat, said system comprising:

a semiconductor chip comprising:
a supply voltage input;
a user having a varying voltage requirement; and
a voltage-regulating circuit, with an output connected to the user, for supplying the user with a drive voltage, the drive voltage being regulated through the use of a reference signal which is supplied to the voltage-regulating circuit from the user; and a heat dissipating device, comprising at least a resistive part, which is connected between the output of the voltage-regulating circuit and the supply voltage input such that the heat dissipating device is connected in parallel with the voltage-regulating circuit, the heat dissipating device dissipating heat by conducting at least a portion of current supplied to the user, wherein the heat dissipating device is external to the semiconductor chip.

4. The system of claim 3 wherein the heat dissipating device comprises only the resistive part.

5. The system of claim 3 wherein the semiconductor chip is a subscriber line circuit.

6. A system for dissipating heat, the system comprising:
a printed circuit comprising:
a supply voltage input;
a user having a varying voltage requirement; and
a voltage-regulating circuit, with an output connected to the user, for supplying the user with a drive voltage, the drive voltage being regulated through the use of a reference signal which is supplied to the voltage-regulating circuit from the user; and a heat dissipating device which is arranged external to the printed circuit and is connected between the output of the voltage-regulating circuit and the supply voltage input, such that the heat dissipating device is connected in parallel with the voltage-regulating circuit, the heat dissipating device dissipating heat by conducting at least a portion of a current supplied to the user.

7. The system of claim 6 wherein the heat dissipating device is a resistance.

8. The system of claim 6 wherein the printed circuit is a subscriber line.

9. The system of claim 6, wherein the user is connected to a subscriber apparatus.

* * * * *